Figure 4:
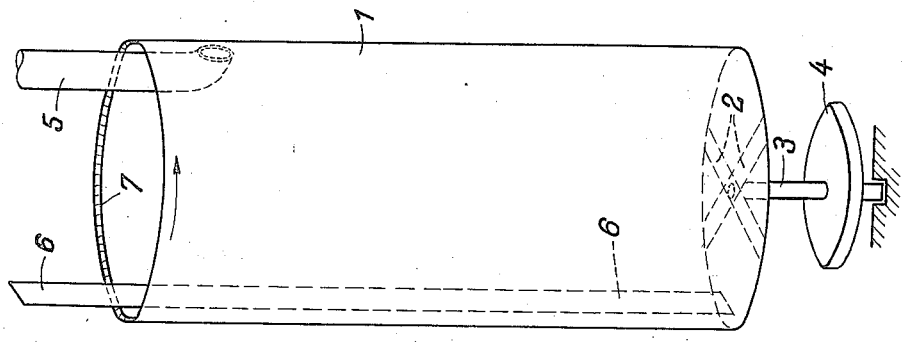

April 22, 1941.　　　E. BIERBRAUER　　　2,239,216
APPARATUS FOR MECHANICALLY SEPARATING MINERAL MIXTURES
Filed July 28, 1938

*Inventor:*
ERNST BIERBRAUER

BY [signature]
ATTORNEYS

Patented Apr. 22, 1941

2,239,216

UNITED STATES PATENT OFFICE 2,239,216

APPARATUS FOR MECHANICALLY SEPARATING MINERAL MIXTURES

Ernst Bierbrauer, Leoben, Germany, assignor to American Lurgi Corporation, New York, N. Y., a corporation of New York Application July 28, 1938, Serial No. 221,842

7 Claims. (Cl. 209—49)

This application is a continuation-in-part of my co-pending application Ser. No. 165,220, filed Sept. 22, 1937, for "Method of mechanically separating mineral mixtures."

This invention relates to a method and device for separating coarse-grained mixtures of substances and constitutes an improvement of the subject matter of my co-pending application Ser. No. 106,057 which deals with a process for dressing coarse-grained mineral mixtures by making use of the different, and if necessary artificially differentiated, adhesiveness of the constituents of the mixtures with respect to more or less solid inorganic or organic adhesion masses.

According to this process, the constituents of a mixture are separated by superficially softening an adhesion mass and bringing it in this condition in contact with the mineral grains. During subsequent solidification the mass firmly unites with the substance capable of adhering thereto. Practical application of this separating method is usually effected by means of rotary drums or bands covered with an adhesion mass, on which the material to be separated is placed and which are passed through corresponding heating and cooling zones. Adhering grains stick during reversal of the support, and the non-adhering substance drops off either automatically or after subjection to a slight mechanical operation, such as tapping.

The employment of solidifying or hardening adhesion masses in the manner indicated affords the advantage that the adhesive forces available for the separation of the minerals are extraordinarily large and thus permit the separation of coarse-grained substances. Notwithstanding the great adhesive forces involved, the cohesion, or tendency to remain united, of the solid adhesion masses is still greater than the adhesion to the adhering component of a mixture, so that the adhering grain can be loosened without pollution and without loss of adhesion mass. This advantage which is particularly important in case organic adhesion masses are used involves, however, drawbacks that become apparent in the practical application of the process. Apart from the fact that the operating equipment is complicated by heating or cooling devices, the manner of setting also has an unfavorable effect. The relatively long period of setting, which in granular mixtures of 15 mm. to 30 mm. grain size amounts for instance to approximately 1–2 minutes, naturally results in a comparatively small output per unit of area of the mechanical members provided with adhesion mass or requires very large adhesive surfaces and consequently machines of large dimensions to attain big outputs.

The invention eliminates this difficulty and while retaining a mode of operation as free from pollution as possible insures considerable shortening of the adhesion process and thus of the throughput rate per unit of area of the adhesive mass. Since the mechanical utilization of the accelerated adhering process by the use of corresponding high-speed machines unavoidably develops additional forces which counteract the adhesive forces, the invention further provides for attaining an increased adhesive effect to compensate this additional forces. It is only by the cooperation of these two factors that an optimum of the success aimed at by the invention can be attained. According to the invention, the acceleration and intensification of the adhesion process are attained by bringing the grains to be separated into intimate contact with the adhesion mass under a certain application pressure instead of merely putting them on the mass, as was done hitherto. Adhesion will then occur the more quickly and intensively the larger the contacting interfaces between the grains and the adhesion mass are. By employing solid yet more or less plastic adhesion agents, such as, up to a certain degree, ice, or, more decidedly, organic substances like the various kinds of bitumen, pitches, waxes and resins, contact over a particularly large area can be obtained by the application pressure. The same or even a still more increased effect may be produced according to the invention by applying the adhesion masses to plastic or elastic supports consisting for instance of caoutchouc or cellular caoutchouc in which instance the adhesion masses need not absolutely to be solid plastic substances. According to the invention, adhesion substances may be used also which consist of a plastic or elastic support provided with a filmy coat of a more or less liquid adhesive, though the coat shall be a mere trace on the support and united therewith by greatest possible adhesion, as then the same advantages and effects will be attained which result from the use of solid adhesion substances.

The application of the mineral grains to be separated to the corresponding treated adhesion masses can be effected in different ways, namely, either by dynamically produced or static pressure, from which different possibilities ensue for practical operation. Static pressure, according to the invention, is transmitted by means of yielding or elastic intermediate substances, such as caoutchouc or cellular caoutchouc, etc., to the grains to be separated so as uniformly to cover all grains irrespective of differences as size and shape. The elastic intermediate means may for instance be used in such manner that the grains to be separated lie on a rubber or spongy rubber plate and a plate provided with adhesion mass is pressed against the grains. Owing to the pliability of the elastic support, all grains will thus come into contact with the adhesion mass, and it depends entirely on the adhesive power of the individual grains whether or not they will unite with the adhesion mass. When the plate provided with adhesion mass is lifted, the adhesive grains will stick to it whilst the non-adhesive grains will remain on the rubber plate.

Owing to the pollution of the adhesion surface the more or less solid adhesion masses, particularly the organic substances, gradually lose their adhesive power, and the surface thereof must therefore be renewed from time to time. In the application of the process described in my older application, which provides for constantly alternating heating and cooling of the adhesion mass, the surface of the latter is automatically renewed due to continuous softening so that special measures and devices for this purpose can be dispensed with. The new method, however, based on the application of surface pressure, often, and particularly when organic adhesion masses are employed, requires additional measures for constantly maintaining uniform and intensive adhesion and thereby the fundamental conditions for continuously carrying out the pressure process. Regeneration could be effected for instance by putting on new adhesion mass, possibly by applying a new layer of molten petroleum bitumen to the existing layer if petroleum bitumen serves as adhesion mass. The surface of the adhesion mass may further be renewed by periodic softening through heating so as to disclose its initial adhesiveness after resolidification. The same end can be attained by mechanical scraping of the used surface layer.

A still simpler expedient is superficially to dissolve or soften the adhesive substances by chemical action to renew or even to increase their adhesive power. When solid organic adhesive substances are employed, regeneration and simultaneous intensification of adhesive power are effected according to the invention by treating the surface with liquid or gaseous organic substances like petroleum and its various products of distillation, benzine, benzene, phenol, cresol, toluene, or with tar oils, paraffin oils etc. The liquid organic regenerating agents may be used as such or as solutions containing the dissolved adhesive substance. It has further been found advantageous to employ the liquid regenerating agents in the form of aqueous emulsions, in which case only very slight amounts of the regenerating agents come into contact with the adhesion mass to be regenerated, so that the action is restricted to the surface.

In addition to organic regenerating agents inorganic purifiers may be used. It has been ascertained for example that particularly sulfuric acid as well as other inorganic acids and bases are suited for this purpose. The regenerating agent is either wiped off or dries or evaporates, so that within a reasonable time the desired firm consistency of the surface of the adhesion mass will be regained. This surface should be in such condition that in the dry state it feels sticky when a finger is passed over it, though the finger should not become soiled even at the exertion of greater pressure. This criterion is mentioned, because it demonstrates in a simple and clear manner the condition of the surface of the adhesion mass as required by the new method and, further, because it illustrates the essential difference of the new method as to the nature and consistency of the adhesion mass used compared with those older methods which employ liquid organic adhesion agents for the separation of fine-grained mineral mixtures, apart from the fact that these older methods lack also artificial differentiation of the adhesiveness of the mineral mixtures preferably applied according to the invention, and by their very nature are restricted to working fine-grained mineral mixtures.

When instead of organic adhesion masses ice or other solidifying inorganic substances are used, the chief regenerating agents will be water or aqueous solutions of the cementing or adhesive substances concerned.

The same effect as that produced by treating the adhesion mass with the organic regenerating agents or their aqueous emulsions mentioned can be attained according to the invention by wetting the grains to be separated with the regenerating liquids after pretreatment.

This step, which may also be carried out during pretreatment as stated below, increases moreover, the adhesion of the adhesive grains to the adhesion mass and thereby facilitates the practical application of the pending application Ser. No. 106,057, substantially the same or similar, usually water soluble, organic reagents are employed for differentiating the adhesiveness of the constituents of a mineral mixture which in flotation practice serve as collecting agents for differentiating the wetting capacity or floatability. The adhesive capacity imparted during this preliminary treatment to one kind of substances with respect to organic adhesion masses can be essentially intensified according to the invention by adding to the aqueous solutions of the collecting agents serving for artificially differentiating adhesiveness water insoluble organic liquids, such as the above mentioned regenerating agents. The amount of addition should be chosen so that the adsorbing substance of the mineral mixture after removal from the solution appears to be quite dry and poorly wettable by water. This will generally occur if the addition amounts approximately up to 2% of the treating liquid. Experiments show for instance that in case of alkaline-earth minerals rendered adhesive relative to organic adhesion masses by being treated with aqueous solutions of sebacates an addition of about 2% petroleum causes a noteworthy increase in the adhesion of the treated substances relative to an adhesion mass consisting of, say, petroleum bitumen. This intensification is so strong, that even a much used adhesion surface to which mineral grains not treated by this addition will not stick any more discloses again great adhesiveness so that regeneration may be dispensed with. This manner of preliminary treatment is therefore highly important for the practical application of the pressure method and forms a valuable step therein.

The following test which can be carried out with simple means will illustrate the pressure method.

The equipment required merely comprises a sponge rubber plate and a sheet metal or wooden plate having about the same size. The latter is covered on one side with a layer of petroleum bitumen having a melting point of about 60° C. and being therefore solid at ordinary room temperature. The mineral mixture to be separated was a natural mixture of about 50% phosphatic material, phosphorite in lumps and 50% gangue, quartzy rubble with a grain size of about 15 to 30 mm. As these two kinds of minerals in their natural water-wetted condition show no adhesiveness relative to the adhesion mass mentioned, the mixture was first subjected to preliminary treatment for differentiation. For this purpose the mixture was thoroughly worked for about 3 minutes with an approximately 1% aqueous solution of sodium palmitate. During this treatment selective adsorption of the palmitate as to the surface of the phosphorite grains will occur, so that owing to the orientation of the molecules connected with adsorption the grains are provided with an outer skin of hydrocarbons and thus with an adhesive cover being affinitive relative to organic adhesion masses. As at this treatment only the phosphorite lumps react in the manner indicated and the quartzy rubble superficially does not undergo any change, the result will be a differentiation in adhesive power. When the pretreated mixture after rinsing with water is placed directly on the adhesion mass mentioned adhesion of the phosphorite lumps capable of adhering will occur only after a few minutes, which however in spite of the long duration, is still relatively slight. If the experimental conditions are, however, chosen according to the invention, instant and firm adhesion will be effected. During the experiment the surface of the adhesion mass was first coated with a solution of petroleum bitumen in petroleum and the coat allowed to dry. The phosphorite-quartz mixture pretreated with palmitate and rinsed with water was then placed on a sponge rubber plate, whereupon the adhesion plate was applied to the grains at slight pressure. Directly after pressing the adhesion plate was lifted again, and it was found that almost all phosphorite grains firmly stuck to it whilst the majority of the quartz grains remained on the rubber support. In this way a concentrate of 98% phosphorite at a phosphorite yield of 90% could be attained.

It has been stated already that the size of the area of contact between the mineral grains and the adhesion mass is decisive with respect to adhesive intensity and that this interface can be increased according to the invention by the use of plastic adhesion masses or by applying adhesives to pliable bodies of plastic or elastic nature. The effect of this measure can also be proved by the small test described. For this purpose the adhesion mass was applied not to a rigid plate but to a sponge rubber sheet which was then secured to a corresponding rigid support. Otherwise, the mode of experimental procedure described was followed again. The test showed an increase in the phosphorite content of the concentrate to about 99% and a yield of 96% instead of 94%. Whilst the increase in yield is directly due to the improved adhesion effect brought about by the elastic adhesion plate, the higher degree of purity of the concentrate must also be ascribed to the use of an elastic support for the adhesion mass. A few quartz grains, particularly such having a particularly porous or jagged surface, stick to the adhesion mass together with the phosphorite grains during pressing for purely mechanical causes. By the expansion of the rubber support of the adhesion mass at the cessation of pressure these very loosely adhering quartz grains are pressed off again from the adhesion mass, and this process constitutes therefore an automatic after-purification of the concentrate and, according to the invention, is utilized in continuous operation to obtain concentrates of the greatest possible purity.

It was further proved by experiments that in the same manner and by using the same reagent in the preliminary treatment of mineral mixtures other alkaline-earth minerals like calcspar, dolomite, magnesite, fluor spar, strontianite, celestite, heavy spar etc. as well as heavy metal minerals of oxidic and sulfidic type, such as siderite, galena etc., can be separated from quartz and other gangue minerals in granulation up to 100 mm. grain size and over. The tables below state the results of such tests made with mixtures of magnesite and serpentine and of siderite and quartz. All mixtures were natural products which for better separation had been previously classified by screening.

*Magnesite—serpentine, granulation 10 to 30 mm.*

| Product | Percent by weight | Magnesite content, percent | Serpentine content, percent | Magnesite yield, percent |
| --- | --- | --- | --- | --- |
| Concentrate | 27.00 | 95.00 | 5.00 | 95.00 |
| Tailings | 73.00 | 2.00 | 93.00 | 5.00 |
| Charge | 100.00 | 27.20 | 72.80 | 100.00 |

*Siderite—quartz, granulation 20 to 35 mm.*

| Product | Percent by weight | Siderite content, percent | Quartz content, percent | Siderite yield, percent |
| --- | --- | --- | --- | --- |
| Concentrate | 63.00 | 96.70 | 3.30 | 97.00 |
| Tailings | 37.00 | 4.20 | 95.80 | 3.00 |
| Charge | 100.00 | 62.40 | 37.60 | 100.00 |

Experiments carried out with the same mineral mixtures, but employing for the preliminary treatment an aqueous palmitate solution to which about 2% petroleum was added led to still sharper separation and permitted moreover, the use of adhesion masses that were quite used up.

Instead of petroleum bitumen and other solid hydrophobe organic adhesion masses inorganic adhesion masses, especially freezing water, were examined also. As to sharpness of separation, pratically the same results were obtained. The process itself differs from the one applied in case of organic adhesion masses in so far as the hydrophile gangue sticks while substances like phosphorite, magnesite, siderite, etc. which have become hydrophobe during the preliminary treatment described do not show any adhesive power relative to ice or other solidifying hydrophile adhesion masses.

As already mentioned all the organic agents used in the flotation for differentiating the floatability are adapted to influence the adhesiveness. Therefore besides the salts of the fatty acids which are especially adapted for alkaline earth minerals such as natrium palmitate also the xanthates, further sulfonates of the alcohols, resin acids and resin soaps as well as aqueous emulsions of oils may be used. The latter are especially advantageous if coals or rocks containing organic ingredients shall be separated from barren rocks, profiting by the differences of adhesiveness. In numerous cases as to coals, graphite and the like their natural adhesiveness to organic adhesion masses is so great that for the differentiation of the adhesiveness a treatment with water only is sufficient. So it was for example possible to separate according to the process described a mixture of coal and slates in a size of 30 to 60 mm. which was before only treated with water.

Concerning the workability of grain sizes it was found that the new method covers grain sizes ranging from approximately 1 mm. to 100 mm. grain diameter. In practical operation the interest of the quality of separation it will be advisable to subject to separation material which does not differ too much in grain size and which has been previously sorted by screening into classes each of which is then worked separately by applying to it the pressure best suited to it.

The method according to the invention can be continuously carried out by the use and suitable combination of simple apparatus and devices of substantially known type. In continuous operation these machines preferably bring the material to be separated under regulatable pressure and with the aid of elastic intermediate means into contact with the constantly or periodically to be regenerated adhesion mass and discharge the adhering grains separately from the non-adhering ones.

Figure 3:
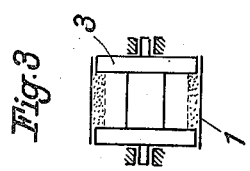
Figure 1:
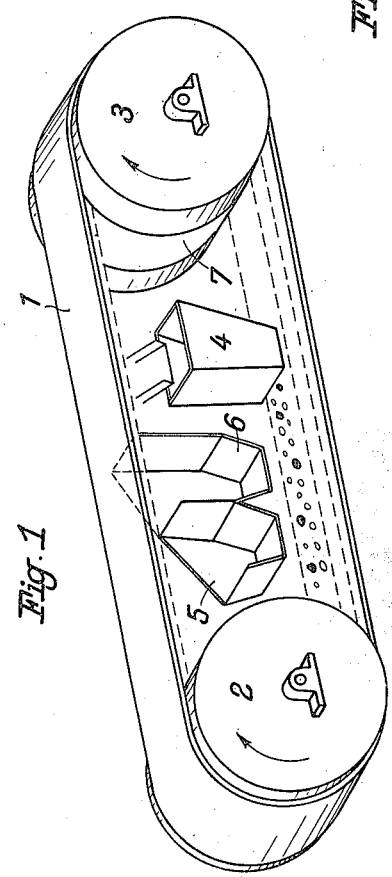
Figure 2:
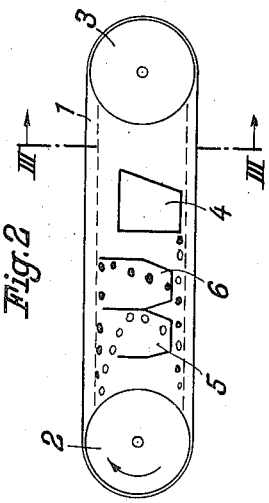

By way of example apparatus for carrying out the mechanical separation of coarse-grained mineral mixtures according to the invention are shown in the accompanying drawing, in which Fig. 1 is a view of a rotating endless band; Fig. 2 is a cross section through the band in the length thereof and Fig. 3 is a section along the line III—III of Fig. 2. Fig. 4 is a view of a similar apparatus. The feature common to both apparatus shown in Figs. 1–4 is the application of centrifugal forces for the production of a pressure when contacting the coarse-grained mineral mixtures with adhesion masses. Whereas in the apparatus according to Figs. 1–3 such centrifugal forces occur only on the two ends of the endless band, the apparatus according to Fig. 4 is rotated with different speeds (revolutions), whereby such centrifugal forces as to adhere the grains of the mineral mixtures to the adhesion masses may be regulated.

In Fig. 1 the rapidly rotated endless band 1 is passed over rolls 2 and 3 and carries on its inside the adhesion masses according to the invention adapted to adhere at least a part, say the values, of the mineral mixtures and adapted to detach said grains or values from the adhesion mass cleanly, i. e. without substantially carrying away or loosing adhesion mass. Preferably the insides of the endless band are first covered with a sponge rubber on which the adhesion masses are coated. The mineral mixtures to be separated are charged on the inside of the band through charging device 4 and are pressed within range of the rollers 2 by centrifugal force at a corresponding high speed of the band against the surface of the adhesion mass, whereby such pressure may be regulated by the speed of the band. The adhering grains of the mineral mixtures, indicated as black grains in the drawing, are detached from the band by a stripper leading to the bunker 6, whereas the non-adhering grains (white in the design) are caused to drop by gravity from the inside of the band at a point where the centrifugal force becomes zero and are collected in the bunker 5. As shown in Fig. 3 only the edges of the band 1 are running over the rollers 2 and 3, a space 7 being provided between the two rollers on each side. The material thus passes only to the centre of the band carrying the adhesion mass, whilst the edges serve only for conveying the band and are not charged with material.

The equipment according to Fig. 4 consists of a rotating drum 1 driven by means 2, 3 and 4 the insides of which preferably are first covered with a sponge rubber and then with a coating 7 of the adhesion masses according to the invention. The mineral grains are charged on the inside of the drum by a charging device 5 adapted to be raised and lowered during rotation of the drum in order to spread the mineral grains over the inner surface of the drum. When reducing the speed of rotation the non-adhering grains drop from the adhesion mass and fall downwards through the drum in a bunker arranged below the drum (not shown). Thereafter the adhering grains are detached from the adhesion mass by suitable means, for instance, a stripper 6 inserted into the drum and moved against the inside of the drum on the surface of the adhesion mass.

The constructions shown serve only as examples of various possibilities the fundamental feature of which according to this form of the invention is a rotated adhesion mass on the inside of an endless band, whereby rubber or sponge rubber may be preferably applied as support for the adhesion masses.

What I claim is:

1. In a machine for separating coarse-grained mineral mixtures, a member having a surface, and an adhesive coating on said surface for receiving such coarse-grained mineral mixtures, the constituents of said mixture having different adhesiveness thereto, said member comprising an endless rotary band having said adhesion coating on its inner surface, means to guide said band in a path having straight and curved portions to impart a centrifugal force to a part of said band in said curved path portions, and means for feeding and discharging said mixtures on and from the inner surface of said band.

2. In a machine for separating coarse-grained mineral mixtures, a member having a surface, and an adhesive coating on said surface for receiving such coarse-grained mineral mixtures, the constituents of said mixture having different adhesiveness thereto, said member comprising an endless rotary band having said adhesion coating on its inner surface, means to guide said band in a path having straight and curved portions to impart a centrifugal force to a part of said band in said curved path portions, and means for feeding and discharging said mixtures on and from the inner surface of said band, said adhesive coating comprising a solid organic substance capable of becoming plastic upon treatment with organic liquids adapted to soften said organic substance and capable of becoming hard upon evaporation of said organic liquids, and having in the dry state such a consistency as to feel tacky without soiling a finger pressed thereon.

3. In a machine as claimed in claim 2, said organic liquid for use with the solid organic substance comprising a liquid selected from the group consisting of petroleum, benzene, phenol, cresol, toluene, tar oils and paraffine oils.

4. In a machine for separating coarse-grained mineral mixtures, a member having a surface, and an adhesive coating on said surface for receiving such coarse-grained mineral mixtures, the constituents of said mixture having different adhesiveness thereto, said member comprising an endless rotary band having an elastic layer on the inside thereof, said layer having a coat of said adhesion mass on the inside surface thereof, means to impart a centrifugal force at least to a part of said band, and means for feeding and discharging said mixtures on and from the interior of said band.

5. In a machine for separating coarse-grained mineral mixtures, a member having a surface, and an adhesive coating on said surface for receiving such coarse-grained mineral mixtures, the constituents of said mixture having different adhesiveness thereto, said member comprising an endless rotary band having an elastic layer on the inside thereof, said layer having a coat of said adhesion coating on the inside surface thereof, means to guide said band in a path having straight and curved portions to impart a centrifugal force at least to said band in said curved path portions, and means for feeding and discharging said mixtures on and from the inner surface of said band.

6. An apparatus for the mechanical separation of coarse-grained mineral mixtures by the difference of their constituents in adhesiveness relative to an adhesion mass comprising in combination an endless rotary band the edges of which are adapted to run over rollers, two pairs of rollers encircled by said band, said band between said rollers having lower and upper rims, a space between each pair of the rollers, an adhesion mass in the middle of the inside of said endless band, means for rotating said band with said adhesion mass, and means for feeding said mineral mixtures on the inner surface of said adhesion mass in the lower run of said belt, the non-adhering constituents discharging from said mass on the inner surface of the upper run of said belt, and means to remove adhering constituents from the inner surface of said belt.

7. An apparatus as claimed in claim 1 in which said adhesive coating comprises bitumen which is solid at room temperature.

ERNST BIERBRAUER.